W. F. MYERS.
PROPELLER.
APPLICATION FILED SEPT. 18, 1912.

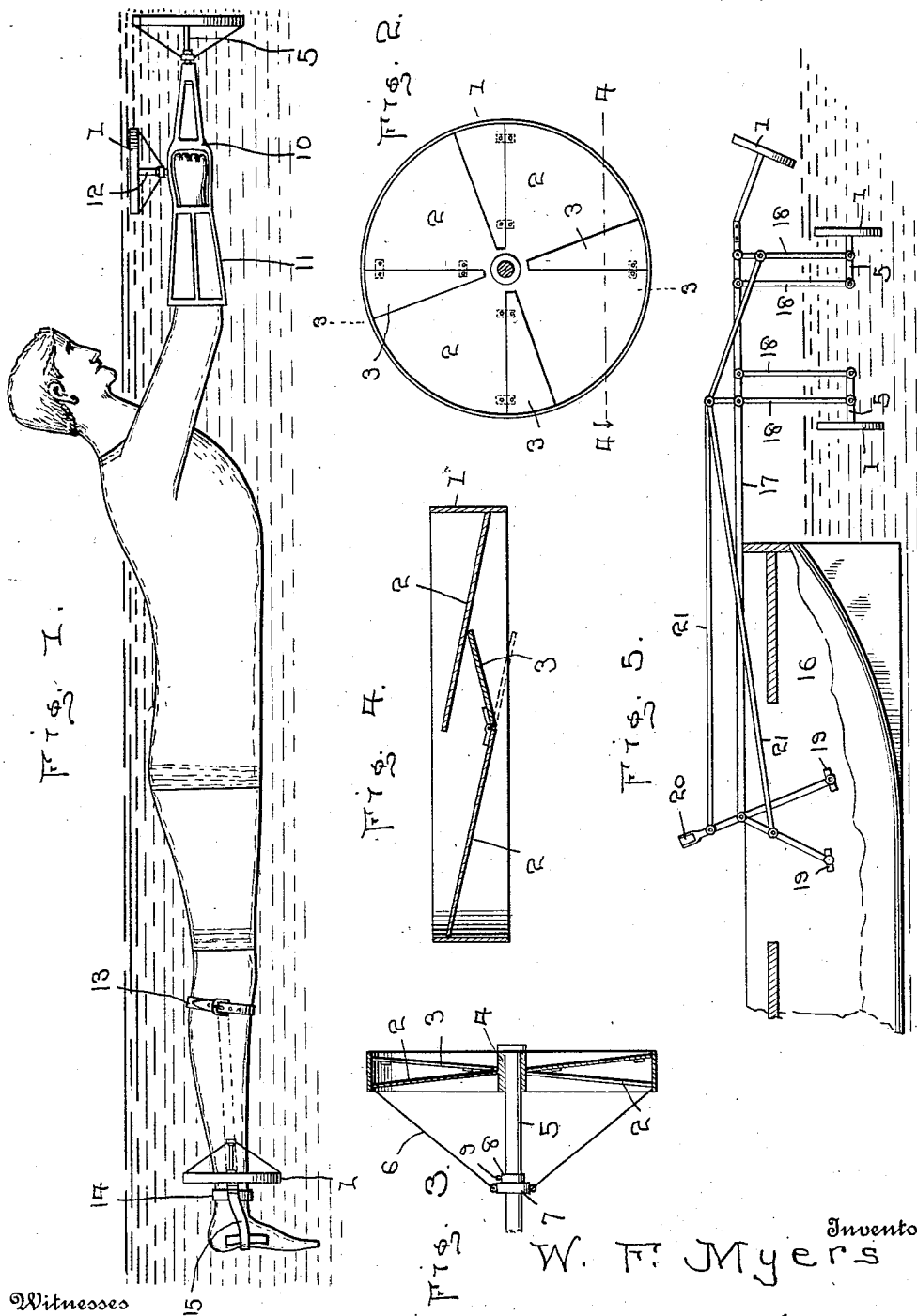

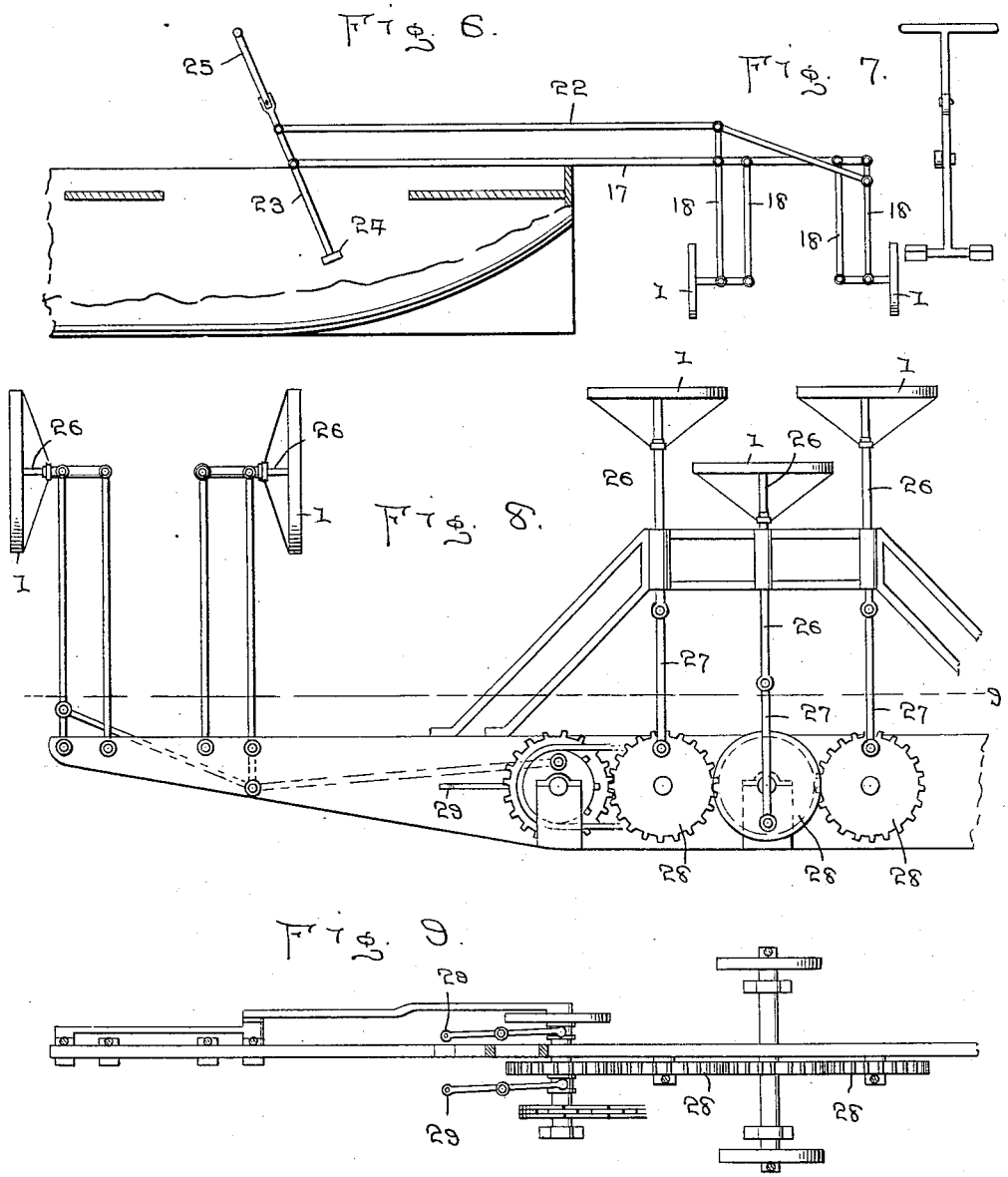

1,065,710.

Patented June 24, 1913.
3 SHEETS—SHEET 3.

Witnesses

Inventor
W. F. Myers
By W. J. FitzGerald & Co.
Attorney

UNITED STATES PATENT OFFICE.

WILLIAM F. MYERS, OF LANSING, MICHIGAN.

PROPELLER.

1,065,710.  Specification of Letters Patent.  Patented June 24, 1913.

Application filed September 18, 1912. Serial No. 721,035.

*To all whom it may concern:*

Be it known that I, WILLIAM F. MYERS, a citizen of the United States, residing at Lansing, in the county of Ingham and State of Michigan, have invented certain new and useful Improvements in Propellers; and I do hereby declare the following to be a full, clear, and exact description of the invention, such as will enable others skilled in the art to which it appertains to make and use the same.

My invention relates to propellers and my object is to provide a propeller of great simplicity of construction and which at the same time will be thoroughly efficient and reliable in a great variety of purposes.

Figure 10:
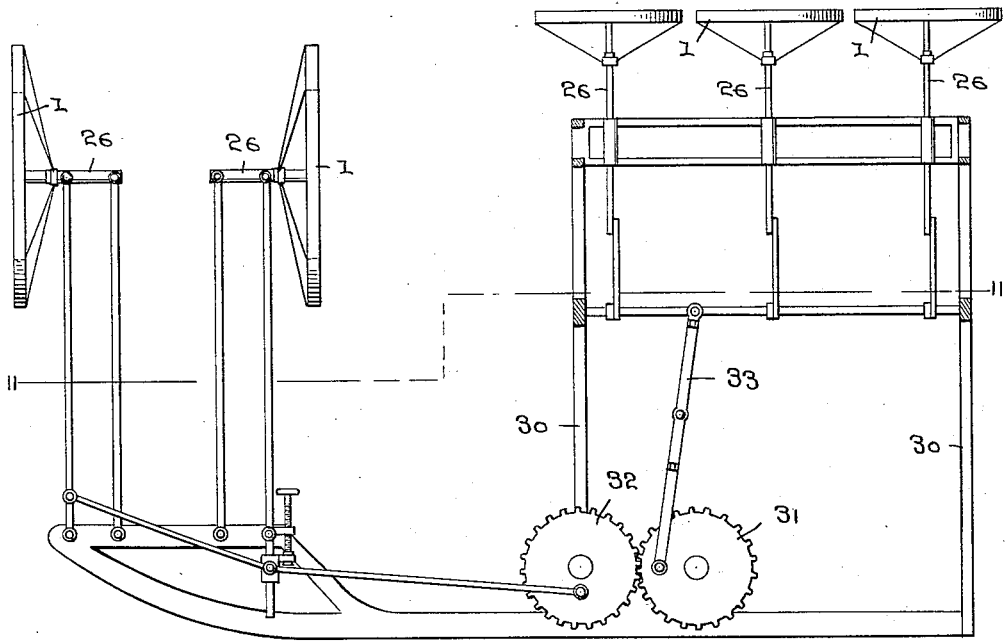
Figure 11:
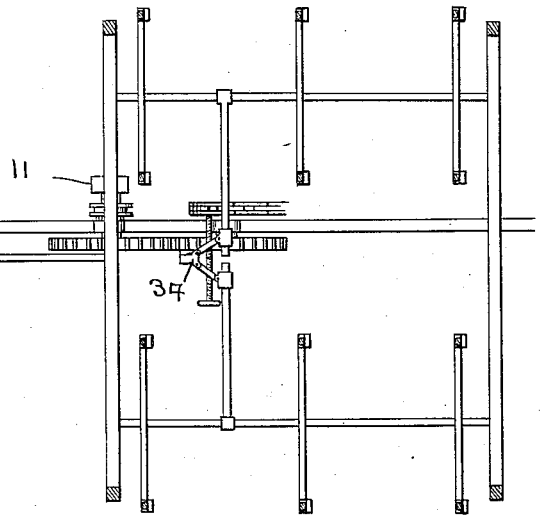

Other objects and advantages will be hereinafter made clearly apparent, reference being had to the accompanying drawings, which are made a part of this application, and in which, Figure 1 shows my invention as applied to use for the purpose of swimming. Fig. 2 is a plan view of my invention complete. Fig. 3 is a central sectional view of my propeller. Fig. 4 is a sectional view on dotted line 4—4 of Fig. 2, looking toward the rim. Fig. 5 shows my invention as applied to use upon a boat. Fig. 6 is a similar view to that shown in Fig. 5 showing a modified application of the device. Fig. 7 is a detail view showing the controlling means used upon a boat for coöperation with the hands and feet of the operator. Fig. 8 shows my invention as applied to use upon a flying machine. Fig. 9 is a top plan view of Fig. 8. Fig. 10 is a side elevation showing a further modification of my invention as applied to use upon a flying machine, while Fig. 11 is a top plan view of Fig. 10 showing the propellers removed.

For convenience of reference to the various details of my invention and coöperating accessories, numerals will be employed, the same numeral applying to a corresponding part throughout the several views.

In Fig. 1, it will be observed that I have shown my improved propeller as used by a swimmer and my swimming appliance consists essentially of a member which opens and closes at a predetermined time, as will be hereinafter more clearly set forth.

My propeller proper consists of the rim like member or body portion 1 having a plurality of blades 2 arranged obliquely to the plane of the rim section 1, as clearly shown in Fig. 4, and to the overlapping edge of one of the members 2, I hinge the movable blade or valve 3 which opens and closes automatically when my propeller is drawn bodily through the water, as will be obvious. To the central portion or meeting ends of the blades 2, I secure the collar like member or bearing 4 in which is operatively disposed the shaft 5, upon which the said collar is designed to rotate. I reinforce the rim or body portion 1 by a plurality of wires or bracing members 6, secured to the shaft 5 in any preferred way, as by the collar 7, the said collar being designed to freely rotate upon the shaft 5 and being prevented from slipping off therefrom by the stationary collar 8, the latter being held in place by the set screw 9 as clearly shown. It therefore follows that when my improved propeller is drawn through the water toward the operator, as in Fig. 1, the valve members 3 will automatically close, thus presenting the entire surface of my propeller in resistance to the water, and thus enabling the swimmer to quickly draw himself forward through the water. It further follows that when the propeller is thrust forward by the operator for a new stroke that the valves 3 will automatically open, when by reason of the inclined position of the blades 2, the propeller of wheel like form will be caused to quickly rotate, thereby passing through the water in a forward movement with a minimum amount of resistance, when the propeller may again be drawn toward the operator in repetition of the operation, thereby insuring that he will be able to force himself quickly through the water, as will be obvious.

In order to place the propeller under the ready control of the operator, I attach to the shaft 5, the handle 10 having an extension 11 designed to fit around the wrist and forearm of the operator, whereby the propeller may be easily held reliably in place and in the performance of its office. In like manner, in some instances, I place an auxiliary shaft 12 upon the upper or lower portion of the handle member 10 and am thereby enabled to place an additional wheel or propeller in proper position whereby the operator may readily hold himself against sinking deeply into the water by an upward and downward movement thereon. In like manner I mount another propeller for each foot, the same being preferably located upon the outer side of the foot and is attached to the leg in any desired manner preferably by means of the strap connections 13 and 14, which are connected together by a suitable bar 15, or the equivalent thereof, the lower end of which is passed under the instep in engagement with the bottom of the foot. By this anchorage it will be observed that the propellers upon the feet are reliably anchored in their operative positions and the operator is thus enabled to rapidly force his way through the water, incident to the usual movement of swimming.

In Fig. 5, I have shown my improved propellers, which are made in the same manner as above specified, as operatively attached to a boat 16, as by the carrying bar 17 to which I pivotally secure the depending bars or links 18, the lower ends of which are connected to the shaft 5 of the propeller in such a manner that said shaft will be held substantially longitudinal in its operation and thereby cause the propellers to pass freely through the water in both directions. It will be understood that the valves 3 are so mounted that they will open on the forward stroke and close on the reverse stroke. In order to operate the propellers, I provide the foot levers 19 and a hand lever 20 which are pivotally mounted upon the boat or upon the bar 17 in such manner that they may be connected, as by the link members 21 to the members 18 in any desired manner, whereby one of the propellers will be drawn forward simultaneously with the rearward movement of the other propeller, thus causing the propellers to alternate in their positions and this reciprocation thereof will insure a rapid propulsion of the boat.

In Fig. 6, I have shown substantially the same construction as that presented in Fig. 5 although in this view only one link member 22 is provided upon the bar 17 while the controlling lever 23 is provided at its lower end with a foot coöperating attachment 24 and the upper end thereof with a suitable handle 25 for manual operation. In this manner one of the members 18 is extended upward sufficiently to provide a point of attachment for the link 22, the end of said link being pivotally connected to one of the members 18, which form of connection insures that one of the propellers will be brought forward and the other driven rearward, as will be obviously apparent.

In Figs. 8 and 9, I have shown my improved form of propeller as applied to use upon a flying machine and I reserve the right to make any reasonable modifications and changes therein which may be regarded as falling fairly within the scope of my invention. In Fig. 8, the propellers indicated by the numeral 1 are provided with a suitable shaft 26 and said propellers are multiplied in number as desired and as deemed necessary to produce the best results. It will be understood that said shafts are mounted either vertically or horizontally, according to the work performed. In Fig. 8 I have shown both the horizontal and vertical disposition of the shaft 26 and to the ends thereof, I operatively connect the source of power, as indicated by the shafts 27, operatively connected with the driving wheels 28. It will be obvious that suitable clutch mechanism 29 may be provided so that the vertically disposed shafts may be alone driven or they may be driven in connection with the propellers upon the horizontal shafts by a simple and suitable clutch mechanism designed for that purpose.

In Figs. 10 and 11, I have shown a special form of framework 30 upon which I operatively mount in suitable bearings, the vertically disposed shafts 26, said shafts being operatively connected to the source of power 31 and 32 in any desired manner, as by the connecting levers 33. When my improved propellers are disposed horizontally and the shafts 26 carrying the same are properly reciprocated, it follows that my propellers will have great lifting power, and it is furthermore obvious that they may be rapidly or slowly operated so that the upward movement of the machine will be slow or fast, as the operator may desire.

Believing that the construction and operation of my invention have been made clearly apparent, further description is deemed unnecessary.

What I claim and desire to secure by Letters-Patent is:—

In a propelling mechanism of the character specified, the combination with a suitable body portion or rim section; of a plurality of blades obliquely disposed relative to the plane of the rim, and a plurality of valve like members carried by the overlapping edges of said blades whereby the valves will automatically close and open incident to the reciprocation of the propeller.

In testimony whereof I have signed my name to this specification in the presence of two subscribing witnesses.

WILLIAM F. MYERS.

Witnesses:
C. A. NEALE,
J. C. EXLINE.

Copies of this patent may be obtained for five cents each, by addressing the "Commissioner of Patents, Washington, D. C."